United States Patent
Terasawa et al.

(10) Patent No.: US 10,069,197 B2
(45) Date of Patent: Sep. 4, 2018

(54) ATC ANTENNA DEVICE, ATC SIGNAL TRANSMISSION DEVICE AND VEHICLE

(71) Applicant: Mitsubishi Electric Corporation, Chiyoda-ku, Tokyo (JP)

(72) Inventors: Hideo Terasawa, Tokyo (JP); Kenichi Nakagawa, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 68 days.

(21) Appl. No.: 15/127,270

(22) PCT Filed: May 22, 2014

(86) PCT No.: PCT/JP2014/063613
§ 371 (c)(1),
(2) Date: Sep. 19, 2016

(87) PCT Pub. No.: WO2015/177911
PCT Pub. Date: Nov. 26, 2015

(65) Prior Publication Data
US 2017/0110791 A1    Apr. 20, 2017

(51) Int. Cl.
*H01Q 1/32*    (2006.01)
*H01Q 7/00*    (2006.01)
*B60L 15/40*    (2006.01)
*B60L 3/00*    (2006.01)

(52) U.S. Cl.
CPC ............ *H01Q 1/3291* (2013.01); *B60L 3/003* (2013.01); *B60L 15/40* (2013.01); *H01Q 1/3216* (2013.01); *H01Q 7/00* (2013.01); *B60L 2200/26* (2013.01)

(58) Field of Classification Search
CPC ...... B60L 15/40; B60L 2200/26; B60L 3/003; B60L 3/08; H01Q 1/3216; H01Q 1/3291;
(Continued)

(56) References Cited

U.S. PATENT DOCUMENTS 1,655,006 A * 1/1928 Zierdt .................... B61L 3/221
                                                        246/63 R
2,662,934 A * 12/1953 Allison ................... B61L 3/221
                                                        246/194
(Continued)

FOREIGN PATENT DOCUMENTS

| GB | 2027244 A | 2/1980 |
|---|---|---|
| JP | 60-076469 A | 4/1985 |

(Continued)

OTHER PUBLICATIONS

International Search Report (PCT/ISA/210) dated Aug. 19, 2014, by the Japanese Patent Office as the International Searching Authority for International Application No. PCT/JP2014/063613.
(Continued)

*Primary Examiner* — Mark T Le
(74) *Attorney, Agent, or Firm* — Buchanan Ingersoll & Rooney PC

(57) ABSTRACT

An ATC antenna device provided on a body of a lead car to receive signals from outside. In the ATC antenna device, a pair of ATC antenna coils is disposed symmetrically with respect to a center line of the body as viewed in a traveling direction of the body, and the paired ATC antenna coils are connected in series and are of opposite phase. An ATC antenna support device is attached to the body to support the paired ATC antenna coils, and is disposed asymmetrically with respect to the center line.

7 Claims, 17 Drawing Sheets

(58) Field of Classification Search
CPC .. H01Q 7/00; H01Q 1/32; B61L 3/221; B61L 3/121
USPC ........................................................ 105/413
See application file for complete search history.

(56) References Cited

U.S. PATENT DOCUMENTS

| | | |
|---|---|---|
| 3,493,741 A | 2/1970 | Lubich |
| 2013/0220169 A1* | 8/2013 | Taguchi ................ B61D 17/10 105/397 |

FOREIGN PATENT DOCUMENTS

| | | |
|---|---|---|
| JP | 7-39006 A | 2/1995 |
| JP | 10-59180 A | 3/1998 |
| JP | 2001-138914 A | 5/2001 |
| JP | 2003-079011 A | 3/2003 |
| JP | 2008-94174 A | 4/2008 |
| JP | 2014-23189 A | 2/2014 |

OTHER PUBLICATIONS

Written Opinion (PCT/ISA/237) dated Aug. 19, 2014, by the Japanese Patent Office as the International Searching Authority for International Application No. PCT/JP2014/063613.
Extended European Search Report dated Nov. 15, 2017, issued by the European Patent Office in corresponding European Application No. 14892564.7. (11 pages).

* cited by examiner

PRIOR ART

PRIOR ART

ATC ANTENNA DEVICE, ATC SIGNAL TRANSMISSION DEVICE AND VEHICLE

TECHNICAL FIELD

The present disclosure relates to an ATC antenna device, an ATC signal transmission device, and a car.

BACKGROUND ART

Automatic train control (ATC), which is a class of signaling safety systems for railways, requires rolling stock to receive speed signals transmitted from outside (ATC ground device installed on a ground side). Rolling stock is provided with an ATC antenna for receiving the speed signals. The ATC antenna is installed below the floor on the front portion of the lead car of rolling stock. The ATC antenna includes two antenna coils. These two antenna coils are disposed on the front side of a lead bogie and are directly above left and right rails.

For example, in an on-board device disclosed in FIG. 1 of Patent Literature 1, an ATC antenna is disposed below the floor on the front portion of the body of the lead car. Thus, the ATC antenna receives signals from the ATC ground device installed between the rails. Although Patent Literature 1 does not specifically disclose the ATC antenna as the on-board device, the ATC antenna typically includes left and right antenna coils as mentioned above.

The ATC ground device is typically a rectangular loop-shaped coil. This coil is installed such that the loop is horizontal between the left and right rails. The coil includes a coil side that is close to and parallel to the left rail and a coil side that is close to and parallel to the right rail. When an alternating current (AC) having a frequency corresponding to the speed signal is passed through the coil of the ATC ground device, AC magnetic flux in accordance with the frequency of the AC is generated around the coil.

The ATC antenna moves above the rails together with the car. As such, when the ATC antenna passes over the ATC ground device, the AC magnetic flux generated at the ATC ground device induces AC voltage in the coils of the ATC antenna. A speed specified by a signal received from the ATC ground device is detected based on voltage that has a specific frequency component in the induced AC voltage and that exceeds a threshold. Then, the detected speed is used as a command speed for performing speed control of a train.

As previously described, the coil of the ATC ground device is loop shaped. As such, the directions of current through the left and right coil sides are opposite to each other and the directions of voltage induced in the left and right ATC antenna coils are also opposite to each other. Therefore, provided that the left and right antenna coils of the ATC antenna are connected in series and are of opposite phase (to have opposite polarities of the voltage induced by magnetic lines oriented in the same direction), the induction voltages each generated at antenna coils are added together to be an amplified voltage, thereby improving speed detection sensitivity.

Current used for propelling other cars flows through the rails on which rolling stock travels. This current is called return current. Magnetic flux occurs around the rails due to this return current. The return current travels in the same direction in the left and right rails. As such, when the left and right antenna coils of the ATC antenna detect magnetic flux caused by return current, the direction of induction voltage is the same for the left and right coils. As previously described, since the left and right ATC antenna coils are connected in series and are of opposite phase, the voltages induced in the left and right coils of the ATC antenna due to the magnetic flux caused by the return current cancel each other out. Thus, the voltage of the specified frequency components is substantially lower than the threshold. This enables erroneous detection of speed signals to be prevented based on the voltage induced by magnetic flux that occurs due to the return current.

Such series connection of the oppositely phased left and right coils of the ATC antenna allows sensitive reception of the ATC speed signals that would otherwise be received under the influence from the return current flowing through the rails.

CITATION LIST

Patent Literature

Patent Literature 1: Unexamined Japanese Patent Application Kokai Publication No. 2003-079011

SUMMARY OF INVENTION

Technical Problem

Inverter-driven rolling stock is recently predominant. A traction motor is driven by AC that flows from an inverter to the traction motor. By changing the frequency of the AC with the inverter, the revolutions of the traction motor is adjusted, and the traveling speed of a car body is controlled.

When the lead car is a motive power car driven by the traction motor, AC magnetic flux of the fundamental frequency of the AC and AC magnetic flux of harmonic waves occur at the traction motor cable and the traction motor body that are mounted in the lead car. By passing the AC magnetic flux in the vicinity of the ATC antenna through a magnetic circuit formed by the traction motor, the body, the rails, and the like, AC voltage is also induced in the left and right antenna coils of the ATC antenna. The frequency of AC flowing through the traction motor is variable in a range extending to a frequency of the maximum speed. Therefore, the frequency of a fundamental wave or a harmonic wave may match a specified frequency of AC flowing through the ATC ground device. When both frequencies match, there is a possibility that an ATC speed signal might be erroneously detected due to the AC voltage induced in the left and right coils of the ATC antenna by AC flowing through the traction motor.

The present disclosure has been made in view of the foregoing, and an objective of the present disclosure to provide an ATC antenna device, an ATC signal transmission device, and a car capable of preventing the erroneous detection of the ATC speed signal caused by AC magnetic flux of fundamental waves and harmonic waves generated by AC flowing through the traction motor.

Solution to Problem

To achieve the foregoing objective, in the ATC antenna device according to the present disclosure, a support for supporting a pair of ATC antenna coils is disposed asymmetrically with respect to a center line of a car body as viewed in the traveling direction of the car body. The paired ATC antenna coils are disposed symmetrically with respect to the center line of the car body and are connected in series and are of opposite phase.

Advantageous Effects of Invention

According to the present disclosure, the support for supporting the paired antenna coils is asymmetrical with respect to the center line of the car body, and the paired antenna coils are symmetrical with respect to the center line of the car body and are connected in series and are of opposite phase. As such, the AC magnetic flux of fundamental waves and harmonic waves, which occurs at a cable and a traction motor body due to AC flowing through a traction motor, passes through the paired antenna coils in phase via the support. Given that the paired antenna coils are connected in series and are of opposite phase, the induction voltages, which are caused by the AC magnetic flux occurring in each antenna coil in phase, cancel each other out. This, as a result, enables erroneous detection of ATC speed signals due to AC magnetic flux of fundamentals waves and harmonic waves generated by AC flowing through the traction motor to be prevented.

BRIEF DESCRIPTION OF DRAWINGS

FIG. 8 is a diagram illustrating a magnetic circuit through which AC magnetic flux flows that occurs at a traction motor, traction motor cables, and the like;

DESCRIPTION OF EMBODIMENTS

Hereinafter, embodiments of the present disclosure are described with reference to the drawings.

Embodiment 1

First, Embodiment 1 of the Present Disclosure is Described.

Figure 1:
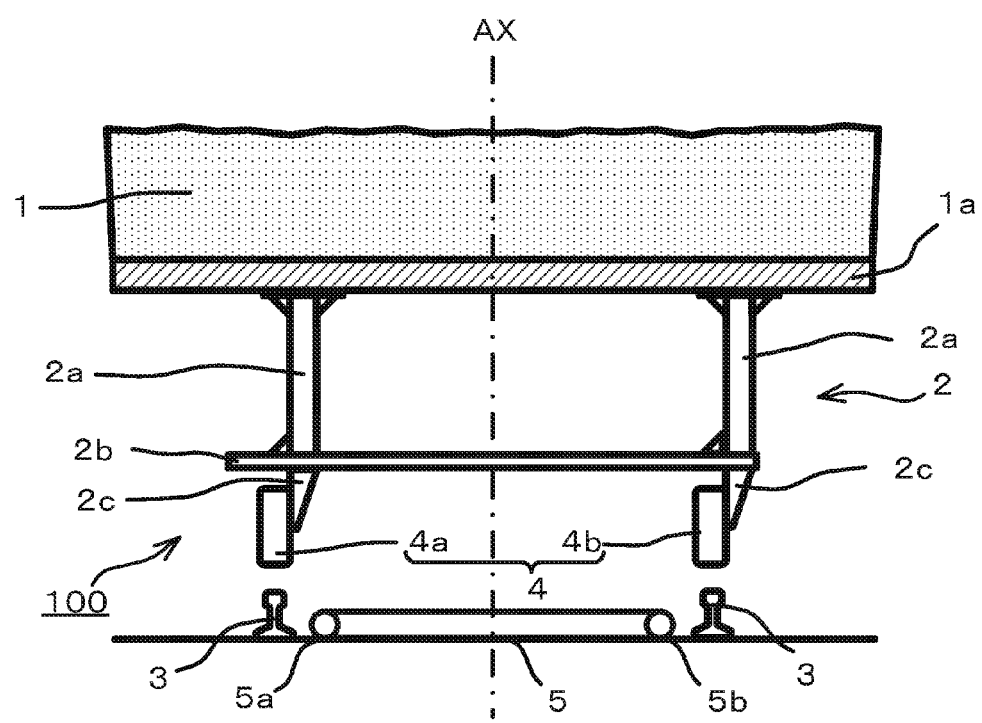
FIG. 1 is a diagram illustrating an ATC antenna device according to Embodiment 1 of the present disclosure, as viewed from the front of a car.
Figure 2:
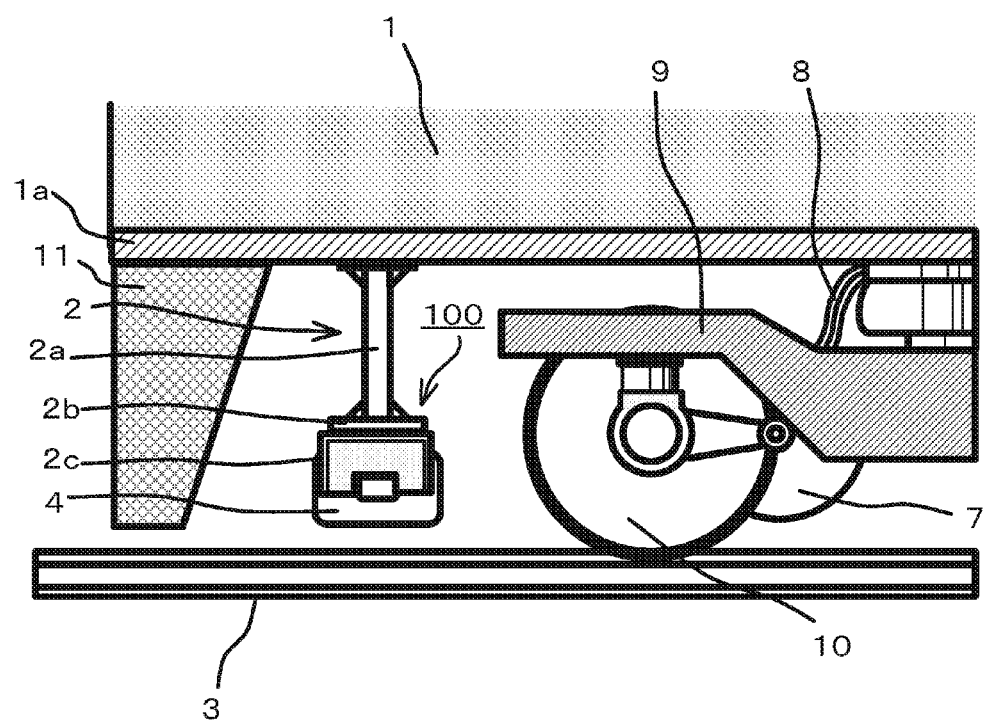
FIG. 2 is a diagram illustrating the ATC antenna device of FIG. 1, as viewed from the side of the car.
Figure 3:
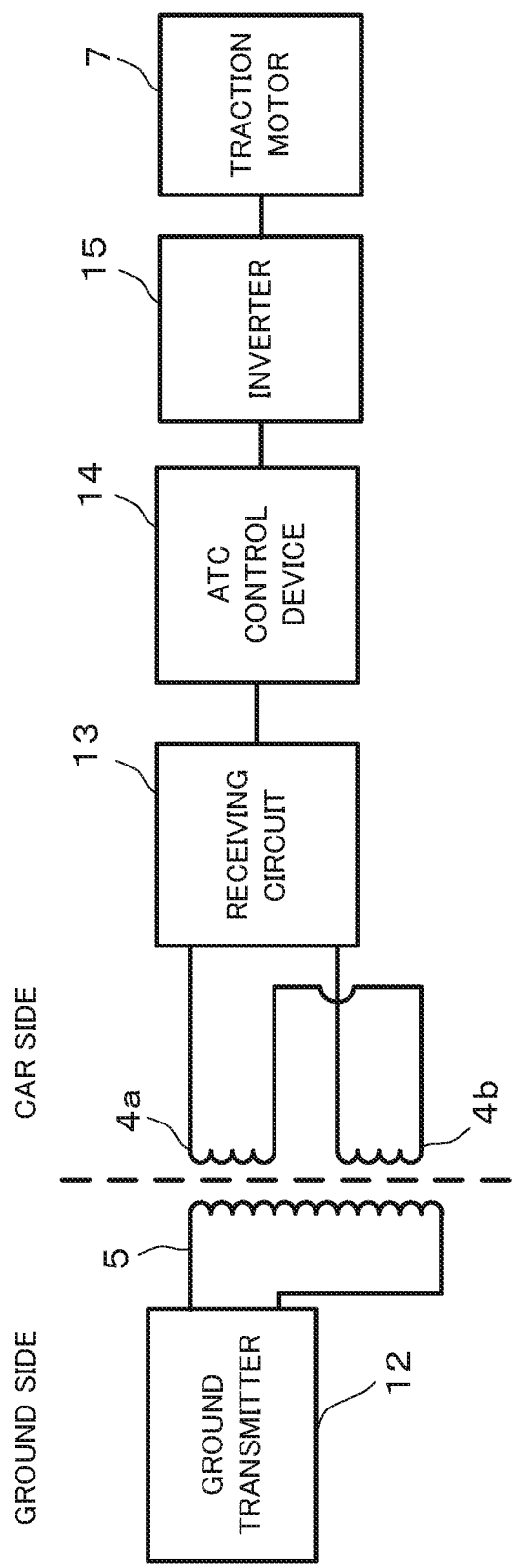
FIG. 3 is a block diagram illustrating a configuration of a control system for performing automatic train control.

FIG. 1 illustrates an ATC antenna device according to Embodiment 1 of the present disclosure, as viewed from the front of a car. FIG. 2 illustrates the ATC antenna device as viewed from a side of the car. FIG. 3 illustrates a control system for performing automatic train control (ATC). As illustrated in FIGS. 1 and 2, a body 1 is a body of rolling stock traveling on rails 3. An ATC antenna device 100 is attached to the bottom portion of an underfloor frame 1a of the body 1.

The ATC antenna device 100 is provided on the body 1 of the lead car of rolling stock. The ATC antenna device 100 receives ATC signals (speed signals) from an ATC ground device 5 that is laid between the rails 3. The ATC antenna device 100 includes an ATC antenna 4 (a pair of ATC antenna coils 4a and 4b) disposed symmetrically with respect to a center line AX of the body 1 as viewed in the traveling direction of the body 1, and an ATC antenna support device 2 that is attached to the car to support the ATC antenna coils 4a and 4b and is asymmetrically disposed with respect to the center line AX. The ATC antenna support device 2 supports the paired ATC antenna coils 4a and 4b from the same lateral direction (right side in FIG. 1) as viewed in the traveling direction of the body 1.

The ATC antenna support device 2 includes two vertically extending ATC antenna support bars 2a. The two ATC antenna support bars 2a are disposed to the right and to the left of the center line of the body 1 with a prescribed distance therebetween. The top end of the two ATC antenna support bars 2a are fixed to the bottom portion of the underfloor frame 1a.

The ATC antenna support device 2 includes a horizontally extending ATC antenna support base 2b that is suspended from both bottom ends of the two ATC antenna support bars 2a.

The ATC antenna support device 2 includes ATC antenna attaching members 2c both of which are disposed on the bottom portion of the ATC antenna support base 2b, and oriented in the same lateral direction. The ATC antenna 4, namely, the paired ATC antenna coils 4a and 4b are fixedly attached to the ATC antenna attaching members 2c, and are oriented in the same lateral direction.

As above, the ATC antenna support device 2 is integrally formed by the ATC antenna support bars 2a, the ATC antenna support base 2b, and the ATC antenna attaching members 2c, which are fastened or fixed together with bolts and the like, or welded together and the like.

In the ATC antenna support device 2, the left and right ATC antenna coils 4a and 4b of the ATC antenna 4 are attached to either the right side or the left side of the ATC antenna attaching members 2c. In other words, the ATC antenna support device 2 is formed in an asymmetrical shape with respect to the ATC antenna 4 (the paired ATC antenna coils 4a and 4b). With the ATC antenna 4 (the paired ATC antenna coils 4a and 4b) attached to the ATC antenna attaching members 2c with bolts and the like, the ATC antenna support device 2 is affixed with bolts and the like to the bottom portion of the underfloor frame 1a of the body 1.

The position in the right-and-left direction of the ATC antenna support device 2 fixed to the underfloor frame 1a, as illustrated in FIG. 1, is not a position that is symmetrical with respect to the center of the body 1. In contrast to this, the ATC antenna 4, namely, the paired ATC antenna coils 4a and 4b attached to the ATC antenna support device 2 are disposed symmetrically with respect to the center line AX of the body 1.

As illustrated in FIG. 1, the ATC ground device 5 is laid at a ground point between the left and right rails 3 to transmit speed signals to a car side for automatic train control. The ATC ground device 5 is a rectangular loop-shaped coil. This coil is installed such that the loop is horizontal between the left and right rails 3. The coil includes a coil side 5a that is close to and parallel to the left rail 3, and a coil side 5b that is close to and parallel to the right rail 3.

As illustrated in FIG. 2, a bogie frame 9 is installed on the bottom portion of the body 1. Wheels 10 are attached to the bogie frame 9. When the lead car is the motive power car, a traction motor 7 is mounted in the bogie frame 9. Rotary drive of the traction motor 7 causes the wheels 10 to rotate, thereby moving the body 1 along the rails 3. An inverter 15, which is installed beneath the floor of the body 1, and the traction motor 7 are connected together via traction motor cables 8. The traction motor 7 is driven by AC passing through the traction motor cables 8 from the inverter 15.

The ATC antenna support device 2 is disposed in a front position separated from the bogie frame 9 by a prescribed distance. A rail guard 11 is installed on the bottom portion of the front-most area of the body 1. The ATC antenna support device 2 is installed between the rail guard 11 and the bogie frame 9.

As illustrated in FIG. 3, a ground transmitter 12 is provided on the ground side. AC flows from the ground transmitter 12 to the ATC ground device 5 at a frequency in accordance with a command speed to be transmitted. The electromagnetic coupling of the AC induces AC voltage in the antenna coils 4a and 4b of the ATC antenna 4 on the car side. A receiving circuit 13 and the ATC control device 14 thereby detect the command speed, and the command speed is then input to the inverter 15. The inverter 15 drives the traction motor 7 at this command speed.

Next, the operation of the ATC antenna device 100 according to Embodiment 1 is described.

In the ground transmitter 12, a different frequency is set for each target speed signal, and AC of the frequency corresponding to the command speed passes through the ATC ground device 5. When current flows through a conductive wire, magnetic flux occurs around the conductive wire in accordance with the right-hand screw rule. In the case of AC, AC magnetic flux occurs in which a direction changes at the same frequency as the current.

Figure 4:
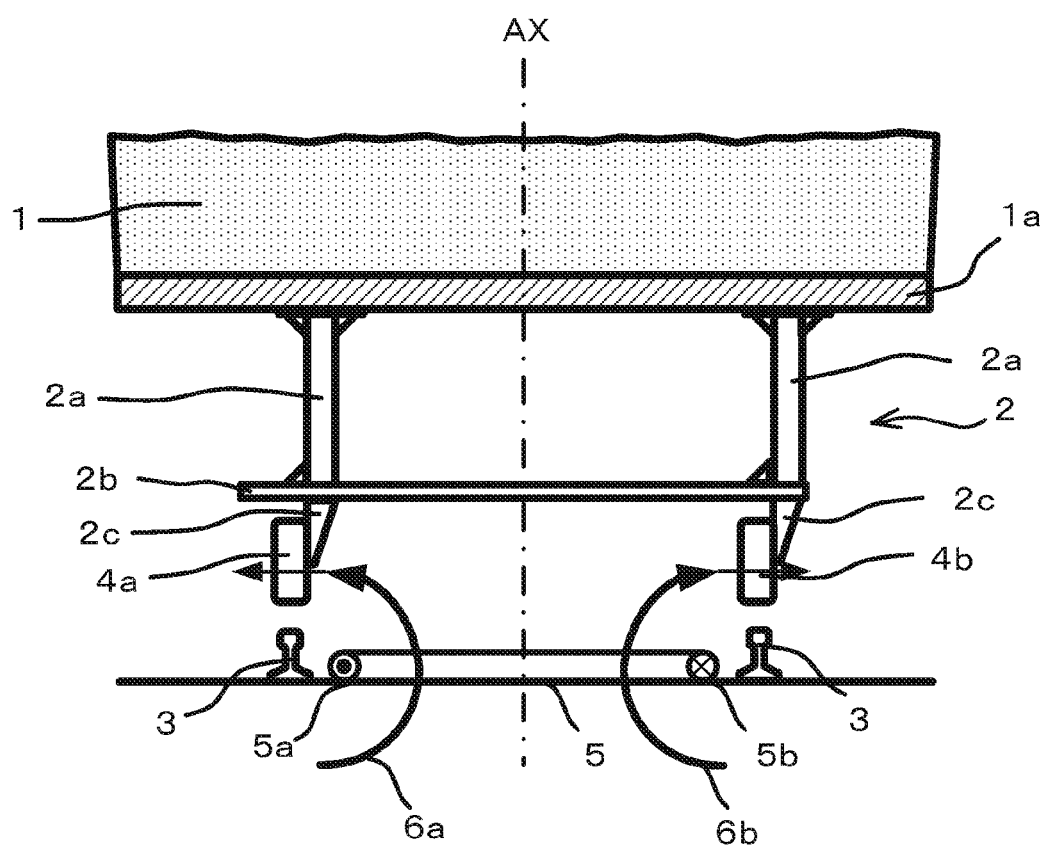
FIG. 4 is a diagram illustrating a relationship between an ATC antenna and a direction of the AC magnetic flux generated at an ATC ground device.

Therefore, as illustrated in FIG. 4, AC magnetic fluxes 6a and 6b having the same frequency as the AC occurs around the coil sides 5a and 5b of the ATC ground device 5. The ATC ground device 5 is a loop shaped coil. The AC magnetic flux 6a, which occurs due to AC flowing through the left coil side 5a parallel to the rails 3, and the AC magnetic flux 6b, which occurs due to AC flowing through the right coil side 5b parallel to the rails 3, flow in directions opposite to each other as illustrated in FIG. 4. Portions of the AC magnetic fluxes 6a and 6b, which occur due to the ATC ground device 5, pass through the ATC antenna 4. AC voltage is induced in the ATC antenna 4 due to the AC magnetic fluxes 6a and 6b.

Figure 5:
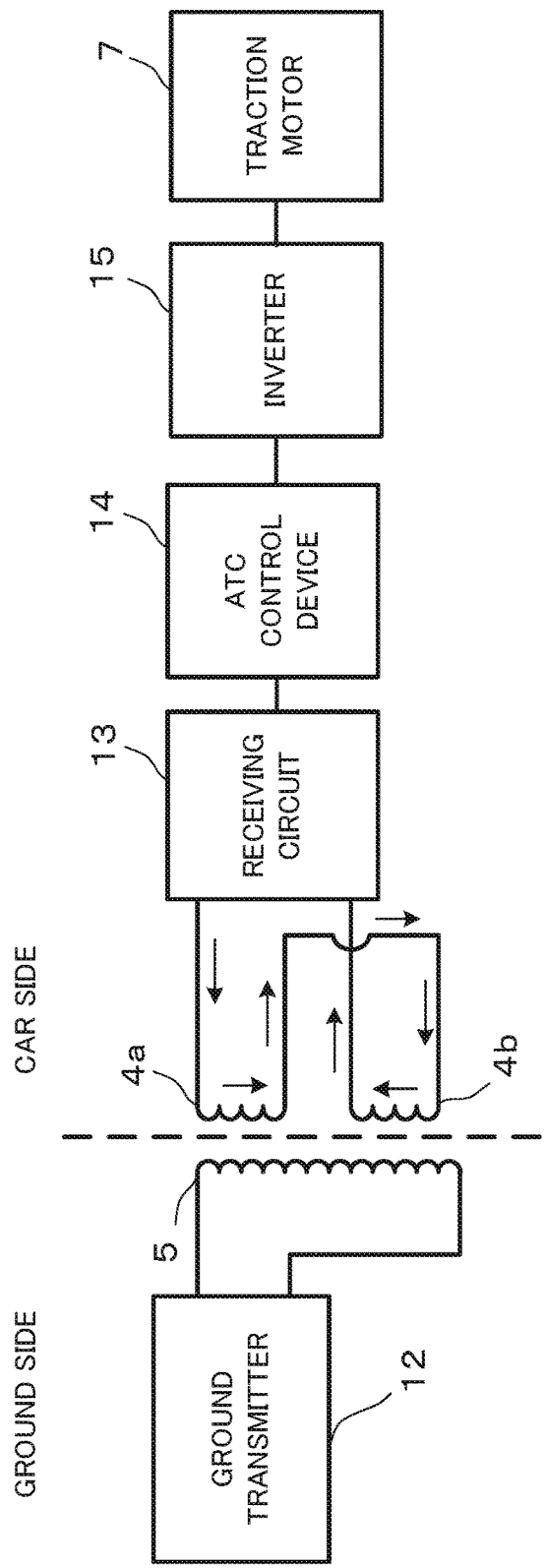
FIG. 5 is a diagram illustrating how AC voltage induced by the AC magnetic flux generated at the ATC ground device is amplified.

The AC magnetic flux 6a mainly passes through the ATC antenna coil 4a on the left, whereas the AC magnetic flux 6b mainly passes through the ATC antenna coil 4b on the right. Therefore, AC voltages are induced in opposite directions in the left and right ATC antenna coils 4a and 4b. The ATC antenna coils 4a and 4b on the left and right are connected in series and are of opposite phase as illustrated in FIG. 3. As such, as illustrated in FIG. 5, the AC voltages having opposite directions in the left and right ATC antenna coils 4a and 4b become a larger AC voltage amplified on the circuit where the AC voltages have the same polarity. The receiving circuit 13 detects a frequency based on the amplified AC voltage, which enables the ATC control device 14 to determine the command speed.

The AC magnetic flux 6a, which occurs due to AC flowing through the left coil side 5a, is what mainly passes through the left ATC antenna coil 4a, and the AC magnetic flux 6b, which occurs due to AC flowing through the right coil side 5b, also passes through the ATC antenna coil 4a. However, the distance between the left ATC antenna coil 4a and the right coil side 5b is greater than the distance between the left ATC antenna coil 4a and the left coil side 5a. Given that the magnitude of the magnetic flux is inversely proportional to the square of the distance, the magnitude of the AC magnetic flux 6b is substantially smaller than the AC magnetic flux 6a, and thus the influence on the alternating voltage detected is rather small. The same applies to the right ATC antenna coil 4b.

Figure 6:
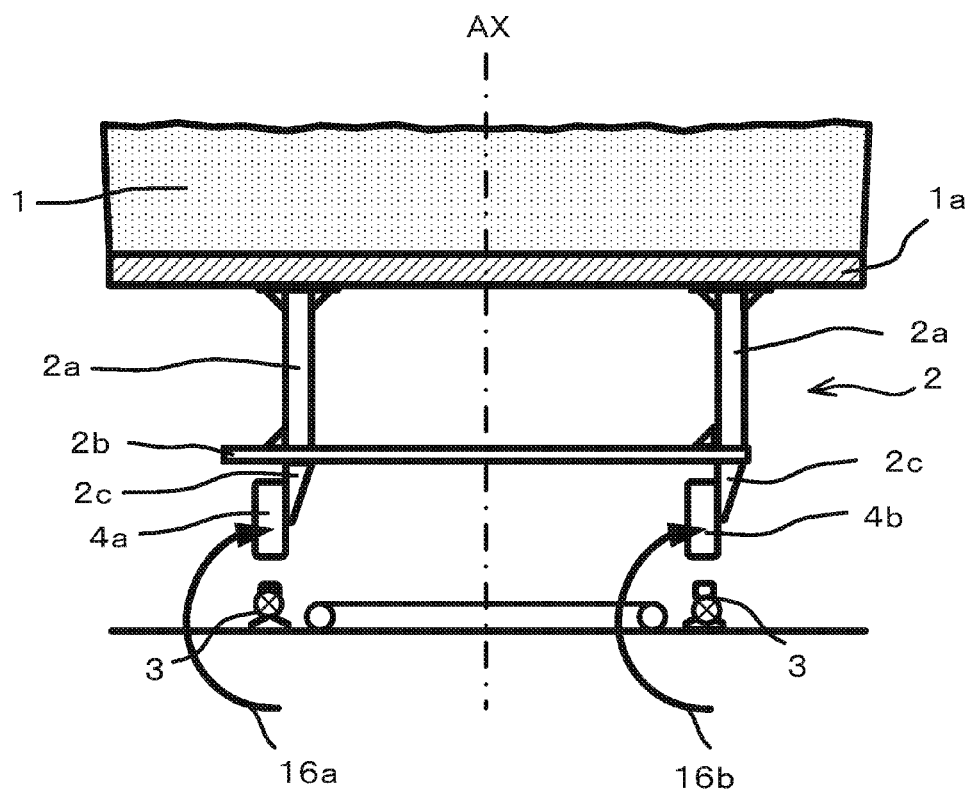
FIG. 6 is a diagram illustrating a relationship between an ATC antenna and a direction of magnetic flux that occurs due to return current.
Figure 7:
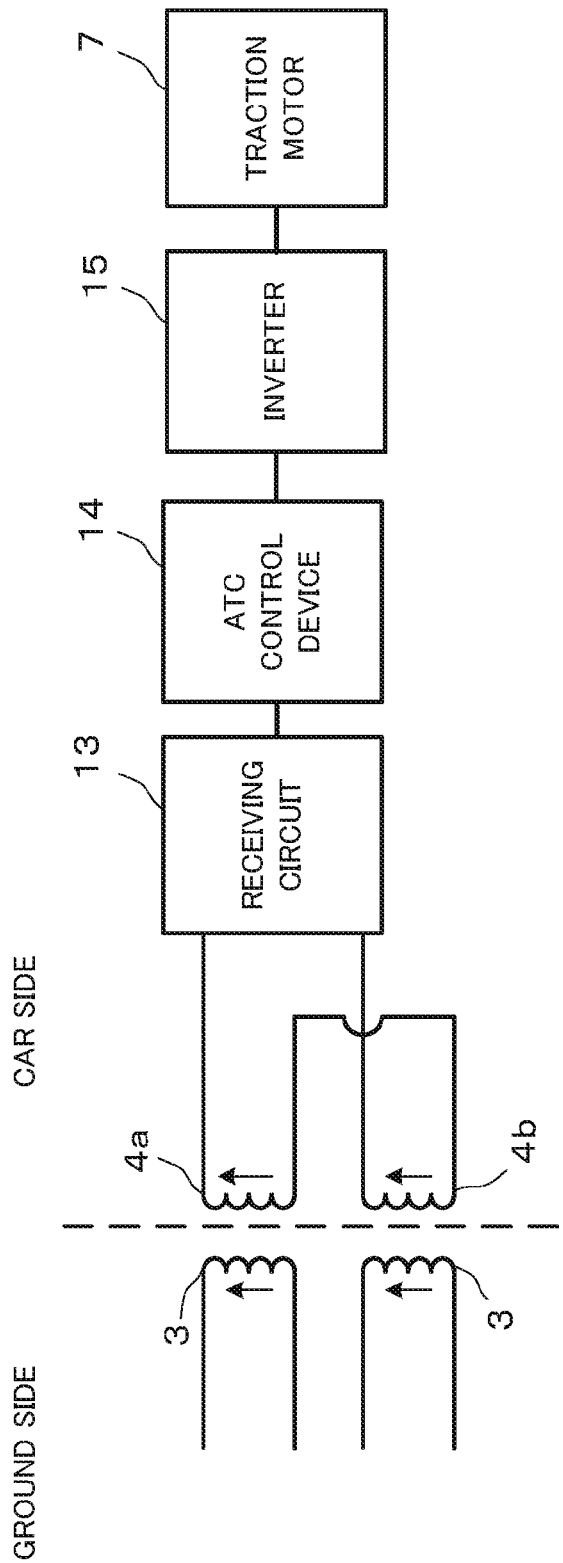
FIG. 7 is a diagram illustrating AC voltage, which is induced by the magnetic flux that occurs due to return current, being offset.

Return current from other cars flows through the rails 3 and such current causes magnetic flux to occur around the rails 3. As illustrated in FIG. 6, the direction of return current flowing through the rails 3 is the same for the left and right rails and the direction of the resulting magnetic flux is also the same. Typically, return current is direct current, but when the magnitude of the current value changes and the magnitude of the resulting magnetic fluxes 16a and 16b changes, the voltage is induced in the ATC antenna 4. In such a case, as illustrated in FIG. 7, given that the directions of the magnetic fluxes 16a and 16b are the same, the AC voltages induced are also in phase and cancel each other out. As such, since the ATC antenna coils 4a and 4b are connected in series and are of opposite phase, the voltages are not erroneously detected as the ATC signals.

Figure 8:
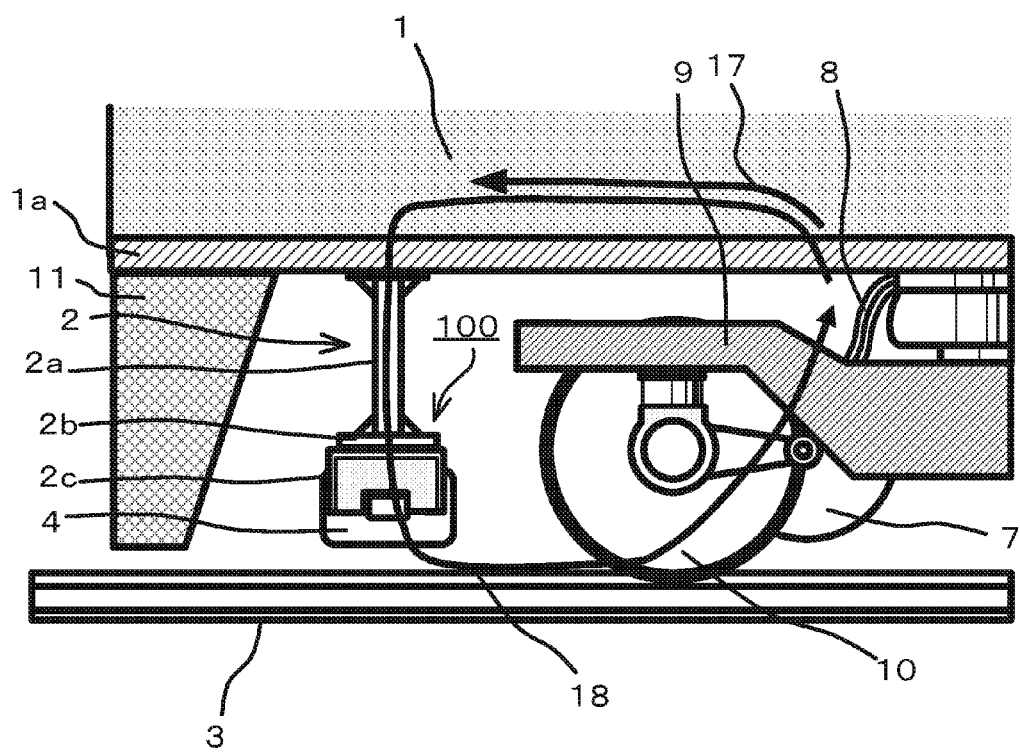

Also, as illustrated in FIG. 2, when the lead car is the motive power car, the traction motor 7 is mounted on the bogie frame 9 that is near the ATC antenna 4 and the AC supplied from the inverter 15 (refer to FIG. 5) flows through the traction motor 7 and the traction motor cables 8. AC flows due to the square-wave AC voltage from the inverter 15, and includes lots of harmonic wave components. When the AC containing harmonic wave components flows through the traction motor 7 and the traction motor cables 8, AC magnetic flux 17 containing frequency components of fundamental waves and harmonic waves occurs. Also, the bogie frame 9, the underfloor frame 1a of the body 1, the wheels 10, the rails 3, the ATC antenna support device 2, and the like are magnetic bodies, and the magnetic bodies are arranged close to one another so as to form a magnetic circuit 18. As a result, as illustrated in FIG. 8, the AC magnetic flux 17, which contains frequency components of fundamental waves and harmonic waves, occurring at the traction motor cables 8 and the traction motor 7 flows around the formed magnetic circuit 18.

Figure 9:
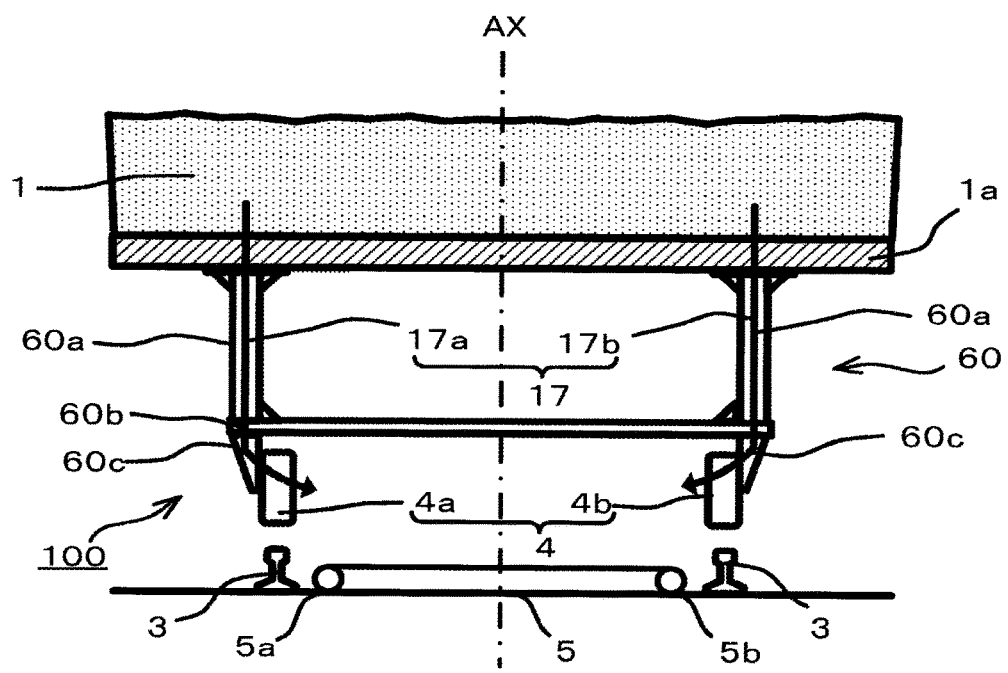
FIG. 9 is a diagram illustrating a direction of the AC magnetic flux that occurs at the traction motor cables and the traction motor body in a conventional ATC antenna device.

A conventional ATC antenna support device 60, as illustrated in FIG. 9, includes ATC antenna support bars 60a on the left and right, an ATC antenna support base 60b, and two ATC antenna attaching members 60c, which are in a horizontally symmetrical configuration around the center line AX. Thus, when flowing through the ATC antenna support device 60, the AC magnetic flux 17 splits to the left and right ATC antenna bars 60a, passes through the ATC antenna coils 4a and 4b, and then flows to the rails 3. The AC magnetic flux 17a that flows through the left ATC antenna support bar 60a passes through the ATC antenna coil 4a from the left side, whereas the AC magnetic flux 17b that flows through the right ATC antenna support bar 60a passes through the ATC antenna coil 4b from the right side. Thus, AC voltages that are induced in the ATC antenna coils 4a and 4b by the AC magnetic fluxes 17a and 17b are of opposite phase.

Figure 10:
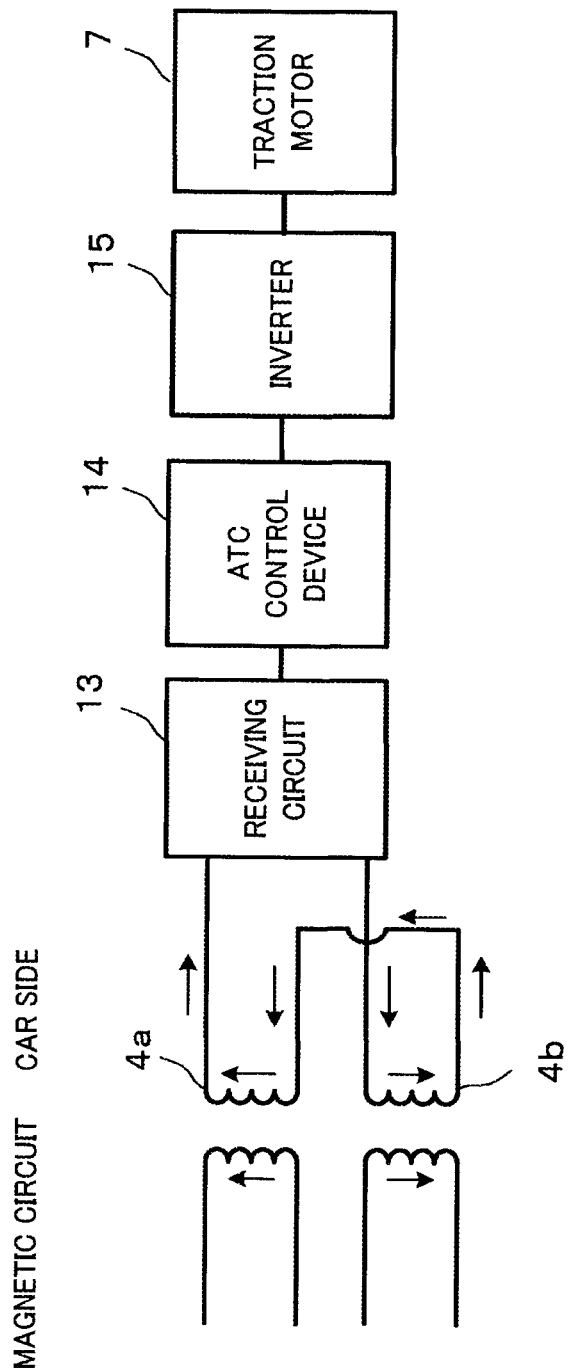
FIG. 10 is a diagram illustrating how AC voltage induced by AC magnetic flux that occurred at the traction motor cables and the traction motor body in a conventional ATC antenna device is amplified.

Therefore, as illustrated in FIG. 10, the ATC antenna coils 4a and 4b are connected in series and are of opposite phase, and thus an amplified voltage is obtained from the AC voltages that are induced in the ATC antenna coils 4a and 4b by the AC magnetic fluxes 17a and 17b. Consequently, when the frequency of the fundamental wave and the harmonic wave of AC flowing from the inverter 15 to the traction motor 7 matches with a frequency corresponding to an ATC speed, and, the amplified AC voltage exceeds a threshold for ATC speed detection, there is a possibility that a command speed at a ground location where the ATC ground device 5 is not installed might be erroneously detected.

Figure 11:
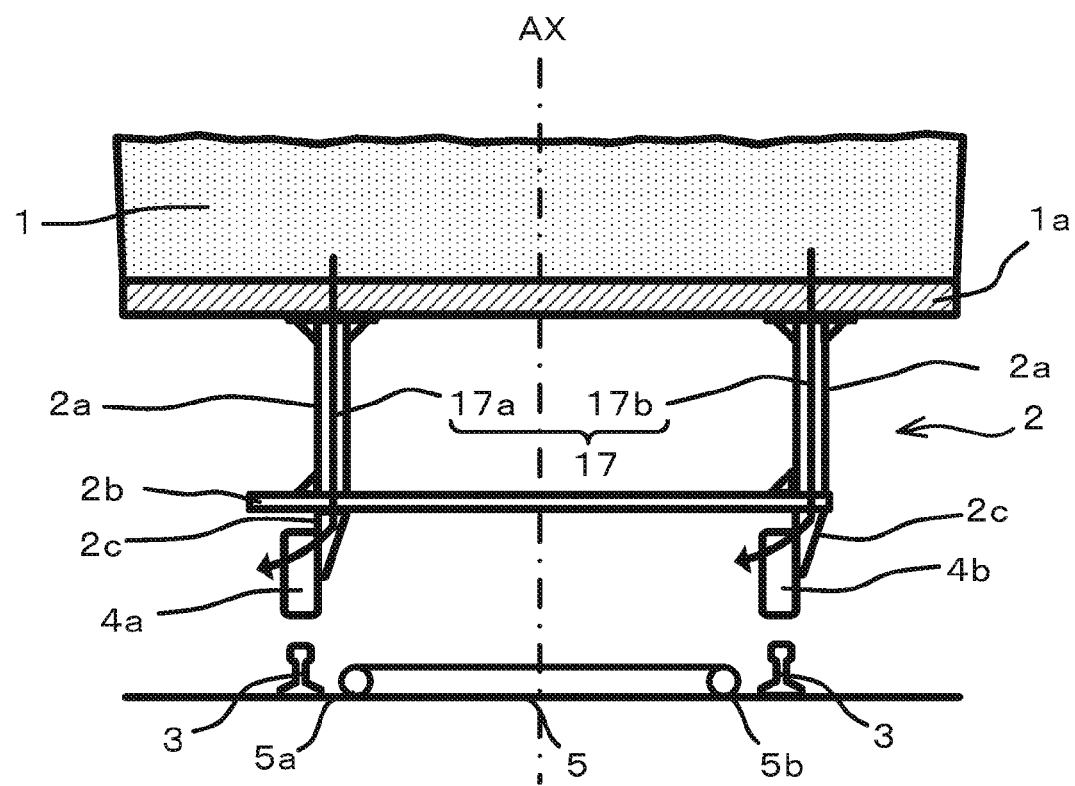
FIG. 11 is a diagram illustrating a direction of the AC magnetic flux that occurred at the traction motor cables and the traction motor body in the ATC antenna device of FIG. 1.

To the contrary, the configuration of the ATC antenna support device 2 according to Embodiment 1, is horizontally asymmetrical as illustrated in FIG. 11. Therefore, the AC magnetic flux 17a flowing through the left ATC antenna support bar 2a passes through the left ATC antenna coil 4a from the right side, and the AC magnetic flux 17b flowing through the right ATC support bar 2a likewise passes through the right ATC antenna coil 4b from the right side. Thus, AC voltages induced in the ATC antenna coils 4a and 4b by the AC magnetic fluxes 17a and 17b are in phase. Given that the ATC antenna coil 4a and the ATC antenna coil 4b are connected in series and are of opposite phase, AC voltages induced in the left and right ATC antenna coils 4a and 4b cancel each other out. This, as a result, enables erroneous detection of ATC command speeds to be prevented. In FIG. 11, since the ATC antenna coils 4a and 4b are attached to the left side of the ATC antenna attaching members 2c, the AC magnetic flux 17 passes through the ATC antenna coils 4a and 4b from the right side. If the ATC antenna coils 4a and 4b are attached to the right side of the ATC antenna attaching members 2c, then the AC magnetic flux 17 will pass through the ATC antenna coils 4a and 4b from the left side, likewise thereby preventing erroneous detection of ATC command speeds.

Figure 12:
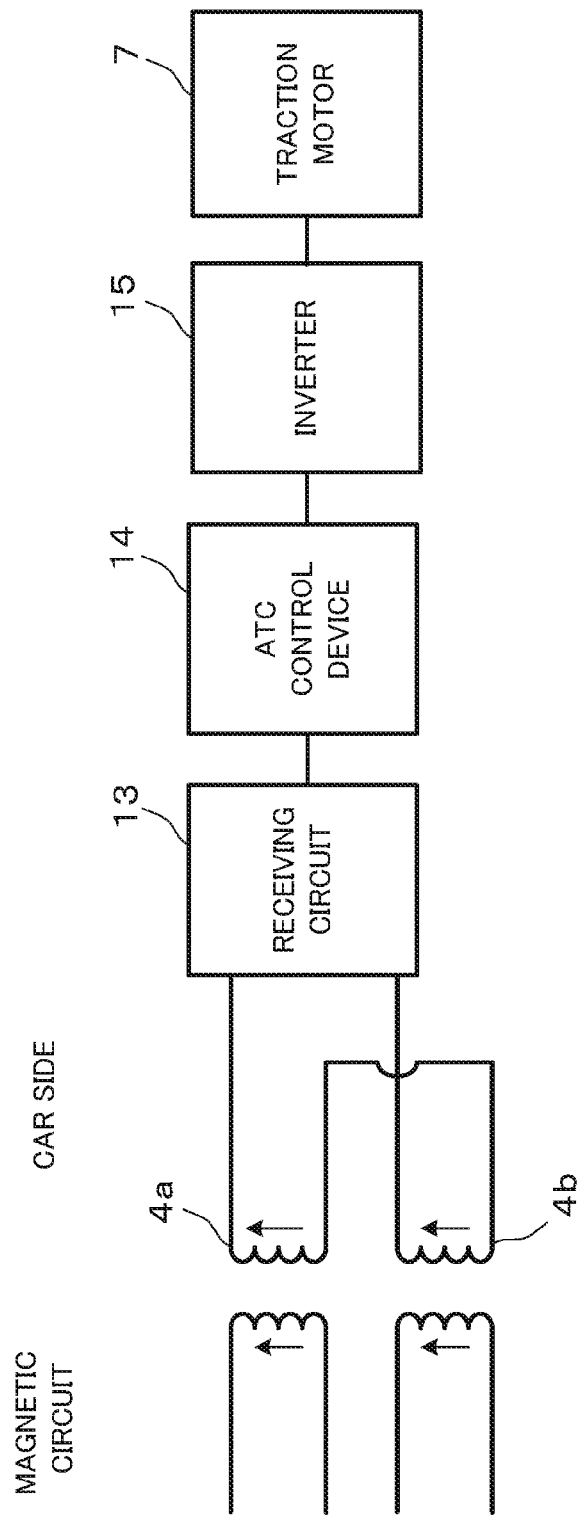
FIG. 12 is a diagram illustrating an offsetting of AC voltage induced by AC magnetic flux that occurred at the traction motor cables and the traction motor body in the ATC antenna device of FIG. 1.

As such, according to the ATC antenna device 100 of the present disclosure, even if AC magnetic flux 17, which has fundamental wave and harmonic wave frequency components, occurs due to AC flowing through the traction motor 7 and the traction motor cables 8, and flows through the magnetic circuit 18 including the underfloor frame 1a, the ATC antenna support device 2, the rails 3, the wheels 10, the bogie frame 9, and the like, passing through the ATC antenna coils 4a and 4b in which AC voltages are thereby induced, the induction voltages in phase cancel each other out because the ATC antenna coils 4a and 4b are connected in series and are of opposite phase, as illustrated in FIG. 12. This enables erroneous detection of ATC command speeds to be prevented even when the AC magnetic flux 17 (17a and 17b) flows around the magnetic circuit 18.

Embodiment 2

Next, Embodiment 2 of the Present Disclosure is Described.

Figure 13:
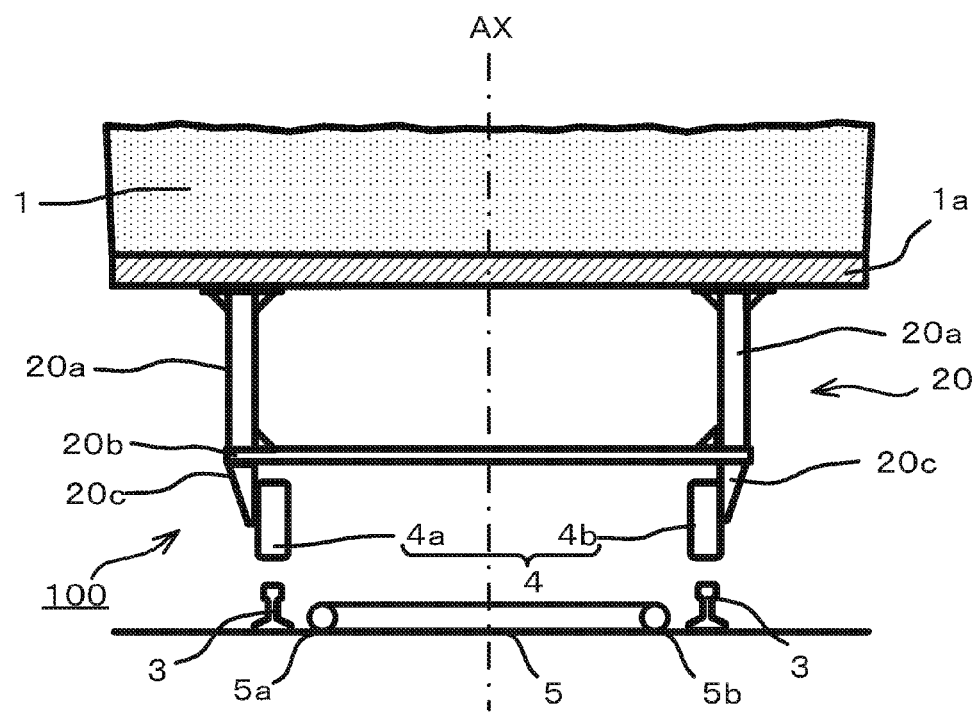
FIG. 13 is a diagram of an ATC antenna device according to Embodiment 2 of the present disclosure, as viewed from the front of the car.
Figure 14:
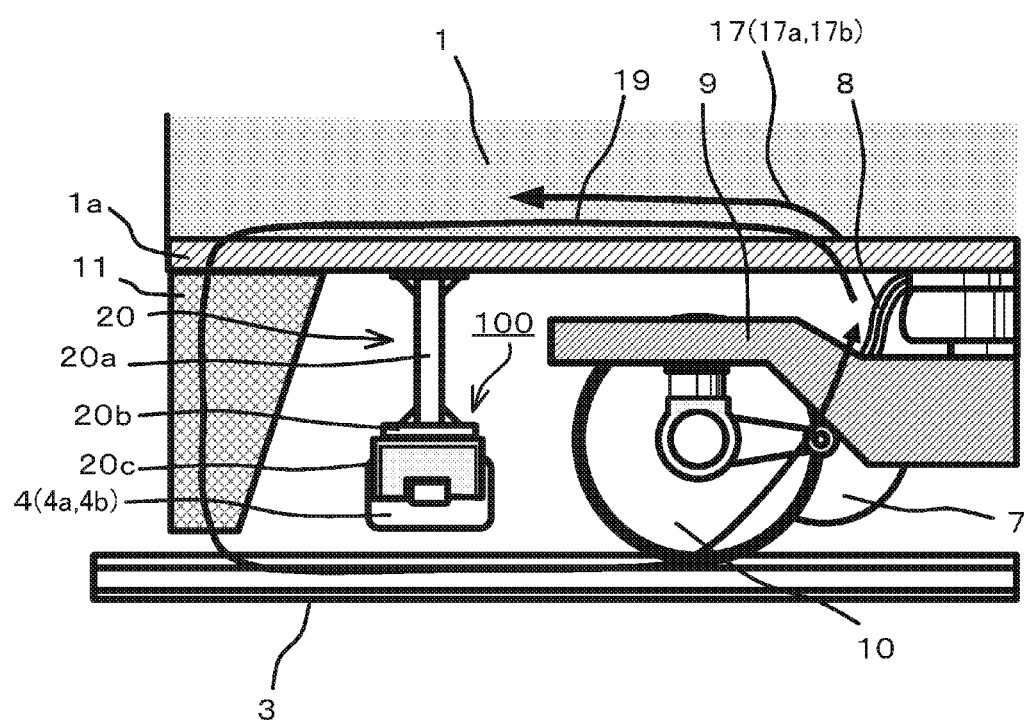
FIG. 14 is a diagram illustrating a magnetic circuit through which AC magnetic flux flows that occurred at the traction motor cables and the traction motor body due to AC flowing through the traction motor.

In the ATC antenna device 100 according to the previously described Embodiment 1, the ATC antenna support device 2 is configured so as to be horizontally asymmetrical. The ATC antenna device 100 according to Embodiment 2 includes an ATC antenna support device 20 instead of the ATC antenna support device 2. The ATC antenna support device 20 includes ATC antenna support bars 20a on the left and right, an ATC antenna support base 20b, and two ATC antenna attaching members 20c. As illustrated in FIG. 13, the ATC antenna support device 20 is horizontally symmetrical with respect to the center line AX, and the ATC antenna support device 20 is constructed by components all made of non-magnetic metal materials, such as stainless steel and the like. In doing so, as illustrated in FIG. 14, the rail guard 11 on the front end of the body 1 serves as a magnetic body between the underfloor frame 1a of the body 1 and the rails 3. As such, a magnetic circuit 19 is formed by the underfloor frame 1a of the body 1, the rail guard 11, the rails 3, the wheels 10, the bogie frame 9, and the like. The AC magnetic flux 17, which occurs at the traction motor cables 8 and the traction motor 7 due to AC flowing through the traction motor 7, flows around the magnetic circuit 19 as illustrated in FIG. 14. Given that the ATC antenna support device 20 is constructed of non-magnetic metal materials, the AC magnetic fluxes 17a and 17b that flow through the ATC antenna support device 20 are rather weak, and thus the magnetic fluxes 17a and 17b that pass through the ATC antenna coils 4a and 4b are also rather weak. Thus, even if AC voltages are induced in the ATC antenna coils 4a and 4b by the magnetic fluxes 17a and 17b, the induced AC voltages do not exceed the threshold. This enables erroneous detection of ATC speed signals to be prevented.

The non-magnetic metal materials for use may include aluminum, alloys thereof, and the like.

Embodiment 3

Next, Embodiment 3 of the Present Disclosure is Described.

Figure 15:
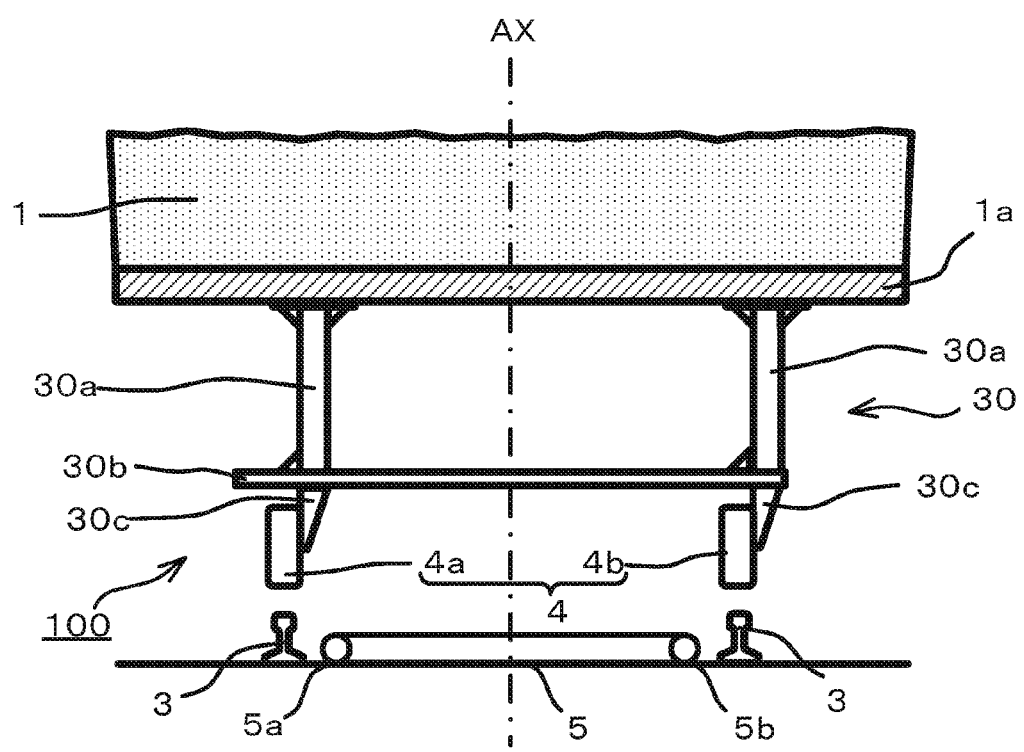
FIG. 15 is a diagram illustrating an ATC antenna device according to Embodiment 3 of the present disclosure, as viewed from the front of the car.

In the previously described Embodiment 2, the ATC antenna support device 20 is constructed by components all made of non-magnetic metal materials. The ATC antenna device 100 according to Embodiment 3, as illustrated in FIG. 15, includes an ATC antenna support device 30 instead of the ATC antenna support device 20. The ATC antenna support device 30 includes ATC antenna support bars 30a on the left and right, an ATC antenna support base 30b, and two ATC antenna attaching members 30c. The ATC antenna support device 30 is horizontally asymmetrical, and in this respect is the same as the ATC antenna support device 2 according to the previously described Embodiment 1. This enables erroneous detection of ATC speed signals to be prevented.

Also, the ATC antenna support device 30 is constructed by components made of non-magnetic metal materials. This further reduces the probability of erroneous detection of ATC speed signals.

Embodiment 4

Next, Embodiment 4 of the Present Disclosure is Described.

Figure 16:
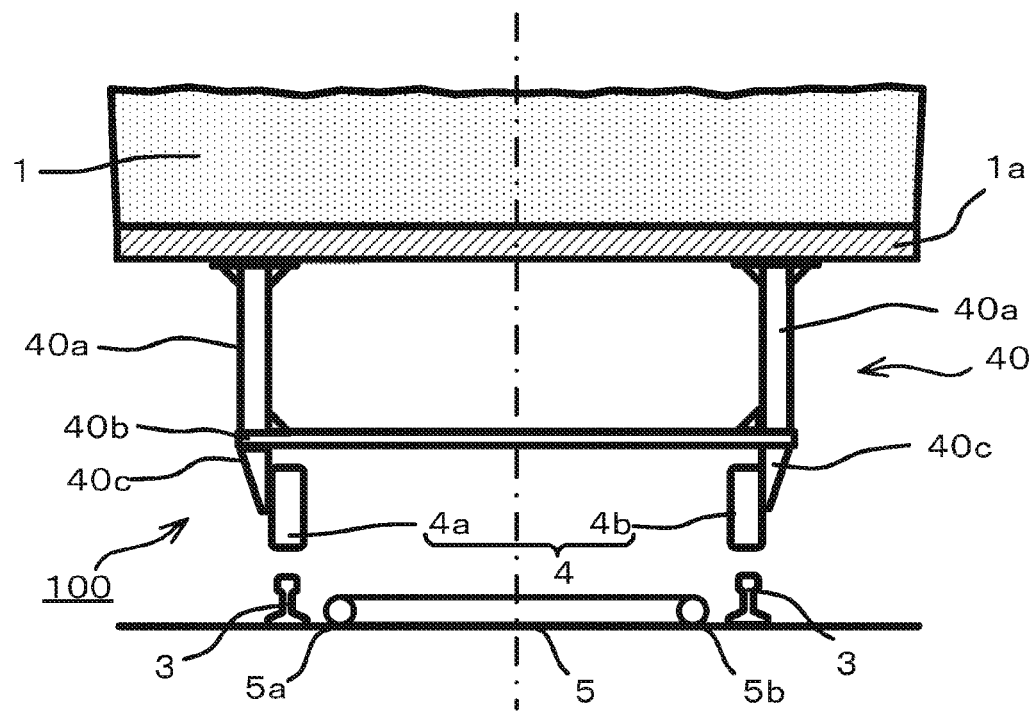
FIG. 16 is a diagram illustrating an ATC antenna device according to Embodiment 4 of the present disclosure, as viewed from the front of the car.

In the previously described Embodiment 2, the ATC antenna support device 20 is constructed of non-magnetic metal materials. The ATC antenna device 100 according to Embodiment 4 includes an ATC antenna support device 40 instead of the ATC antenna support device 20. The ATC antenna support device 40 includes ATC antenna support bars 40a on the left and right, an ATC antenna support base 40b, and two ATC antenna attaching members 40c. The ATC antenna support device 40 is in a horizontal symmetrical configuration with respect to the center line AX as illustrated in FIG. 16, but the material of the ATC antenna support device 40 is a combination of reinforced plastic materials and non-magnetic metal materials. Examples of reinforced plastic that may be used include glass fiber reinforced plastic (GFRP), carbon fiber reinforced plastic (CFRP), and the like. In such a way, the magnetic circuit 19 is formed as illustrated in FIG. 14. The AC magnetic flux 17 that passes through the ATC antenna coils 4a and 4b is rather weak, and the AC voltages induced in the ATC antenna coils 4a and 4b by the AC magnetic flux 17 do not exceed the threshold, thus enabling prevention of erroneous detection of ATC speed signals.

Also, the ATC antenna support device 40 may be constructed solely of reinforced plastic, which can improve the strength of the ATC antenna support device 2 and even reduce the weight thereof.

Embodiment 5

Next, Embodiment 5 of the Present Disclosure is Described.

Figure 17:
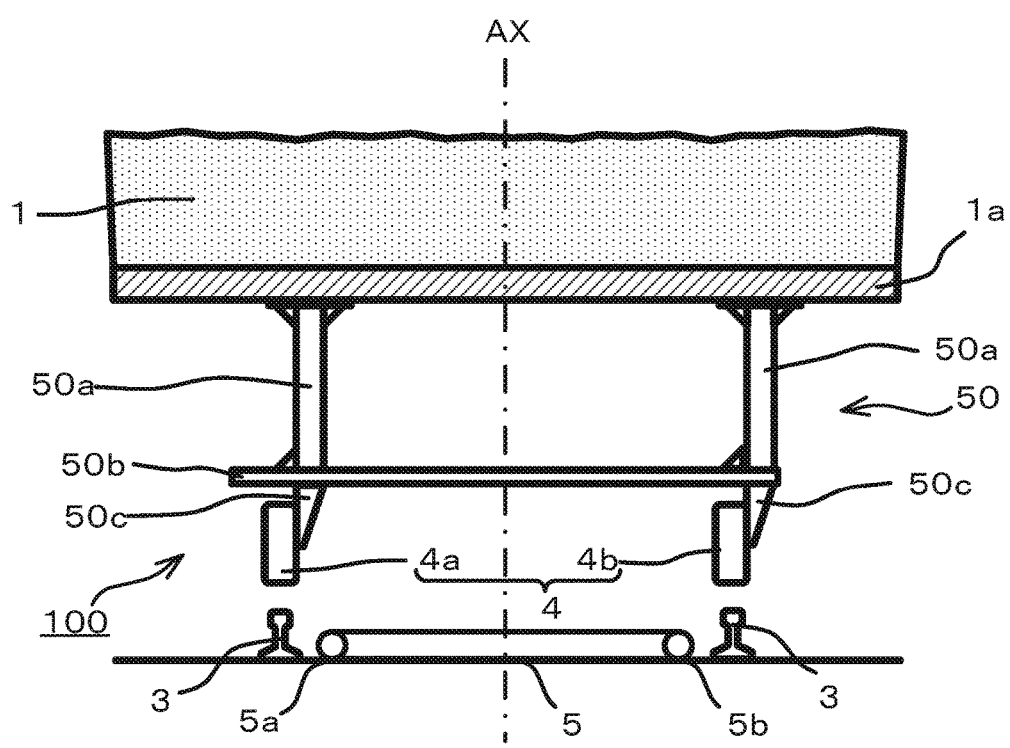
FIG. 17 is a diagram illustrating an ATC antenna device according to Embodiment 5 of the present disclosure, as viewed from the front of the car.

In the previously described Embodiment 3, the ATC antenna support device 30, which is horizontally asymmetrical with respect to the center line, is constructed by components all made of non-magnetic metal materials. As illustrated in FIG. 17, the ATC antenna device 100 according to Embodiment 5 includes an ATC antenna support device 50 instead of the ATC antenna support device 30. The ATC antenna support device 50 includes ATC antenna support bars 50a on the left and right, an ATC antenna support base 50b, and two ATC antenna attaching members 50c. The ATC antenna support device 50 is horizontally asymmetrical, and in this respect is the same as the ATC antenna support device 2 according to the previously described Embodiment 1. This enables erroneous detection of ATC speed signals to be prevented.

Also, the ATC antenna support device 50 is made of a combination of reinforced plastic materials and non-magnetic metal materials. This further reduces the probability of erroneous detection of ATC speed signals.

Also, the ATC antenna support device 50 may be constructed solely of reinforced plastic. Doing so can improve the strength of the ATC antenna support device 2 and even reduce the weight thereof.

As described above, according to Embodiments 1, 3, and 5, the ATC antenna support devices 2, 30, and 50, which support the paired ATC antenna coils 4a and 4b, are asymmetrical with respect to the center of the body 1, and the paired ATC antenna coils 4a and 4b are symmetrical with respect to the center line AX of the body 1. As such, the AC magnetic flux 17, which occurs at the traction motor 7 and the traction motor cables 8, passes through the paired ATC antenna coils 4a and 4b in phase via the ATC antenna support device 2, 30, or 50. Given that the paired ATC antenna coils 4a and 4b are connected in series and are of opposite phase, the induction voltages caused by AC magnetic flux in phase and induced in each of the ATC antenna coils 4a and 4b cancel each other out. This, as a result, enables erroneous detection of ATC speed signals to be prevented by the AC magnetic flux 17 of the fundamental waves and harmonic waves that occur due to AC flowing through the traction motor 7.

Also, according to the previously described Embodiments 2, 3, 4, and 5, the ATC antenna support devices 20, 30, 40, and 50 are formed of non-magnetic metal materials or reinforced plastic or both. Accordingly, the AC magnetic flux 17 resulting from the traction motor current flowing through the ATC antenna coils 4a and 4b is substantially reduced, and this enables erroneous detection ATC command speeds to be prevented. Also, the use of reinforced plastic can improve the strength of the ATC antenna support devices 40 and 50 and even reduce the weight thereof.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure, which is applied to rolling stock that perform ATC, is described as an example, but the present disclosure may also be applied to the automobile industry and general industries in the field of non-contact signal transmission utilizing magnetism.

REFERENCE SIGNS LIST

1 Body
1a Underfloor frame
2 ATC antenna support device
2a ATC antenna support bar
2b ATC antenna support base
2c ATC antenna attaching member
3 Rail
4 ATC antenna
4a, 4b ATC antenna coil
5 ATC ground device
5a, 5b Coil side
6a, 6b AC magnetic flux
7 Traction motor
8 Traction motor cable
9 Bogie frame
10 Wheel
11 Rail guard
12 Ground transmitter
13 Receiving circuit
14 ATC control device
15 Inverter
16a, 16b Magnetic flux
17, 17a, 17b AC Magnetic flux
18 Magnetic circuit including ATC antenna support
19 Magnetic circuit including rail guard
20 ATC antenna support device
20a ATC antenna support bar
20b ATC antenna support base
20c ATC antenna attaching member
30 ATC antenna support device 30a ATC antenna support bar
30b ATC antenna support base
30c ATC antenna attaching member
40 ATC antenna support device
40a ATC antenna support bar
40b ATC antenna support base
40c ATC antenna attaching member
50 ATC antenna support device
50a ATC antenna support bar
50b ATC antenna support base
50c ATC antenna attaching member
60 ATC antenna support device
60a ATC antenna support bar
60b ATC antenna support base
60c ATC antenna attaching member
100 ATC antenna device

The invention claimed is:

1. An Automatic Train Control (ATC) antenna device provided on a body of a lead car to receive signals from outside by electromagnetic coupling, the ATC antenna device comprising:
 a pair of ATC antenna coils disposed symmetrically with respect to a center line of the body of the lead car as viewed in a traveling direction thereof, the paired ATC antenna coils being connected in series and oppositely phased; and
 an ATC antenna support device attached to the body of the lead car to support the paired ATC antenna coils, wherein a first end portion of the ATC antenna support device is connected to a first ATC antenna coil of the pair of ATC antenna coils, and a second end portion of the ATC antenna support device is connected to a second antenna coil of the pair of ATC antenna coils such that the ATC antenna support is longitudinally asymmetric with respect to the center line.

2. The ATC antenna device according to claim 1, wherein the ATC antenna support device supports each of the ATC antenna coils in a same lateral direction when as viewed in the traveling direction of the body.

3. The ATC antenna device according to claim 1, wherein the ATC antenna support device is formed of a non-magnetic metal material, a reinforced plastic, or a combination thereof.

4. An ATC signal transmission device comprising:
 the ATC antenna device according to claim 1; and
 a receiver to receive an induction voltage signal output by the ATC antenna device.

5. A car comprising:
 the ATC antenna device according to claim 1; and
 a body having a bottom to which the ATC antenna device is attached.

6. The ATC antenna device according to claim 1, wherein the ATC antenna support device includes two vertically extending support bars, top portions of the support bars being fixed to the body of the lead car.

7. The ATC antenna device according to claim 1, wherein the ATC antenna support device is formed in an asymmetrical shape with respect to the paired ATC antenna coils.

* * * * *